United States Patent
Liao et al.

(10) Patent No.: US 11,436,106 B1
(45) Date of Patent: Sep. 6, 2022

(54) EFFICIENT METHOD FOR OPTIMIZING LONG-TERM RETENTION BACKUP POLICY WITHIN RECOVERY POINT OBJECTIVES (RPO)

(71) Applicant: EMC IP Holding Company LLC, Hopkinton, MA (US)

(72) Inventors: Mengze Liao, Shanghai (CN); Scott Randolph Quesnelle, Burlington (CA); Jinru Yan, Shanghai (CN); Xiaoliang Zhu, Shanghai (CN); Xiaolei Hu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 15 days.

(21) Appl. No.: 17/192,941

(22) Filed: Mar. 5, 2021

(51) Int. Cl.
*G06F 12/00* (2006.01)
*G06F 11/14* (2006.01)

(52) U.S. Cl.
CPC ...... *G06F 11/1469* (2013.01); *G06F 11/1451* (2013.01); *G06F 11/1461* (2013.01); *G06F 11/1464* (2013.01)

(58) Field of Classification Search
CPC ............. G06F 11/1469; G06F 11/1451; G06F 11/1461; G06F 11/1464; G06F 3/065; G06F 12/0238; G06F 12/0246
See application file for complete search history.

(56) References Cited

U.S. PATENT DOCUMENTS

2006/0041722 A1* 2/2006 Hakura ............... G06F 12/0862
711/120

* cited by examiner

*Primary Examiner* — Shawn X Gu
(74) *Attorney, Agent, or Firm* — Chamberlain, Hrdlicka, White, Williams, & Aughtry (57) ABSTRACT

A efficient method for long-term retention backup policy within recovery point objectives (RPO). Specifically, the disclosed method proposes a dynamic promotion scheme through which short-term retention backup copies, in compliance with specified long-term retention RPOs, may be promoted to render long-term retention backup copies. Further, the disclosed method not only looks to past and/or presently dated short-term retention backup copies, but also looks to prospective (or future) dated short-term retention backup copies, which are expected or predicted to be produced, for promotion. Moreover, in circumstances where there are no appropriate past, present, or future dated short-term retention backup copies to promote, the disclosed method triggers new backup operations to acquire the long-term retention backup copies necessary to maintain the specified long-retention RPOs.

20 Claims, 7 Drawing Sheets

EFFICIENT METHOD FOR OPTIMIZING LONG-TERM RETENTION BACKUP POLICY WITHIN RECOVERY POINT OBJECTIVES (RPO)

BACKGROUND

In the realm of data protection, innumerable methods have been conceived to produce long-term retention backup copies. One such method relies upon the promotion of existing backup copies.

SUMMARY

In general, in one aspect, the invention relates to a method for optimizing long-term retention backup policy. The method includes performing a first search for a first current short-term retention asset copy, computing a first forward duration based on the first search resulting in the first current short-term retention asset copy not being found, obtaining, based on the first forward duration not exceeding a first long-term retention recovery point objective (RPO), a first backup operation prediction for a first next short-term retention backup operation, and waiting, based on the first backup operation prediction forecasting that the first next short-term retention backup operation is most likely to succeed, for a first next short-term retention time interval during which a first next short-term retention asset copy is expected to be created through the first next short-term retention backup operation, wherein the first next short-term retention asset copy is subsequently expected to be promoted to obtain a first current long-term retention asset copy.

In general, in one aspect, the invention relates to a non-transitory computer readable medium (CRM). The non-transitory CRM includes computer readable program code, which when executed by a computer processor, enables the computer processor to perform a method for optimizing long-term retention backup policy. The method includes performing a first search for a first current short-term retention asset copy, computing a first forward duration based on the first search resulting in the first current short-term retention asset copy not being found, obtaining, based on the first forward duration not exceeding a first long-term retention recovery point objective (RPO), a first backup operation prediction for a first next short-term retention backup operation, and waiting, based on the first backup operation prediction forecasting that the first next short-term retention backup operation is most likely to succeed, for a first next short-term retention time interval during which a first next short-term retention asset copy is expected to be created through the first next short-term retention backup operation, wherein the first next short-term retention asset copy is subsequently expected to be promoted to obtain a first current long-term retention asset copy.

In general, in one aspect, the invention relates to a system for optimizing long-term retention backup policy. The system includes a backup storage system that includes a computer processor, and memory that includes instructions, which when executed by the computer processor, enables the computer processor to perform a method. The method includes performing a search for a current short-term retention asset copy, computing a forward duration based on the search resulting in the current short-term retention asset copy not being found, obtaining, based on the forward duration not exceeding a long-term retention recovery point objective (RPO), a backup operation prediction for a next short-term retention backup operation, and waiting, based on the backup operation prediction forecasting that the next short-term retention backup operation is most likely to succeed, for a next short-term retention time interval during which a next short-term retention asset copy is expected to be created through the next short-term retention backup operation, wherein the next short-term retention asset copy is subsequently expected to be promoted to obtain a current long-term retention asset copy.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to an efficient method for optimizing long-term retention backup policy within recovery point objectives (RPO). Specifically, the disclosed method proposes a dynamic promotion scheme through which short-term retention backup copies, in compliance with specified long-term retention RPOs, may be promoted to render long-term retention backup copies. Further, the disclosed method not only looks to past and/or presently dated short-term retention backup copies, but also looks to prospective (or future) dated short-term retention backup copies, which are expected or predicted to be produced, for promotion. Moreover, in circumstances where there are no appropriate past, present, or future dated short-term retention backup copies to promote, the disclosed method triggers new backup operations to acquire the long-term retention backup copies necessary to maintain the specified long-retention RPOs.

Figure 1:
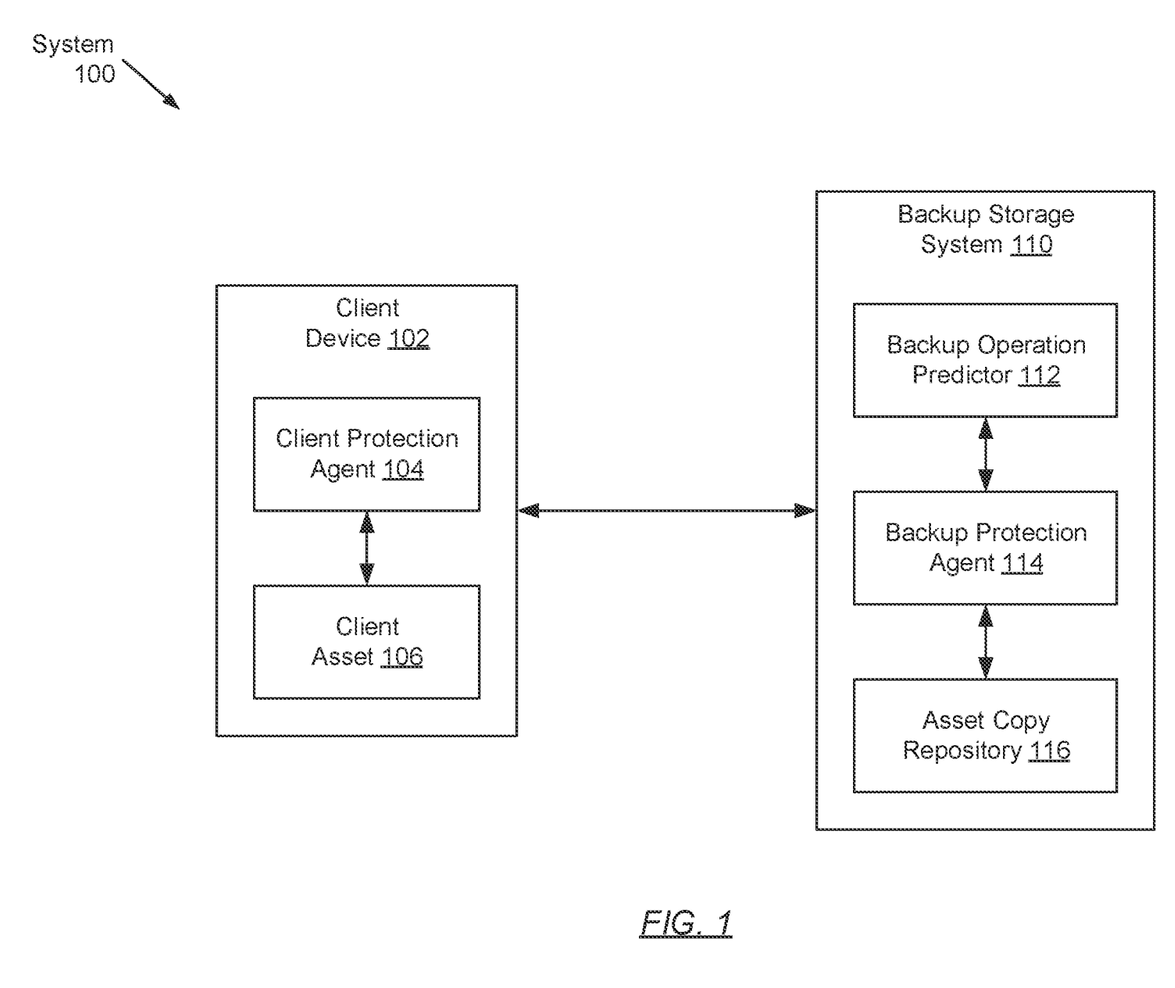
FIG. 1 shows a system in accordance with one or more embodiments of the invention.

FIG. 1 shows a system in accordance with one or more embodiments of the invention. The system (100) may include a client device (102) that operatively connects to a backup storage system (110). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device (102) may represent any physical appliance or computing system designed and configured to receive, generate, process, store, and/or transmit digital data, as well as to provide an environment in which one or more computer programs may execute thereon. The computer programs (e.g., client protection agent (104) (described below)) may, for example, implement large-scale and complex data processing; or implement one or more services offered locally or over a network. Further, in providing an execution environment for any computer programs installed thereon, the client device (102) may include and allocate various resources (e.g., computer processors, memory, storage, virtualization, network bandwidth, etc.), as needed, to the computer programs and the tasks (or processes) instantiated thereby. One of ordinary skill will appreciate that the client device (102) may perform other functionalities without departing from the scope of the invention. Examples of the client device (102) may include, but are not limited to, a desktop computer, a laptop computer, a server, a mainframe, or any other computing system similar to the exemplary computing system shown in FIG. 3. Moreover, the client device (102) may include, but is not limited to, a client protection agent (104) and a client asset (106). Each of these client device (102) subcomponents is described below.

In one embodiment of the invention, the client protection agent (104) may refer to a computer program that may execute on the underlying hardware of the client device (102). Specifically, the client protection agent (104) may be configured to perform client-side asset backup and recovery operations. To that extent, the client protection agent (104) may protect one or more client assets (e.g., client asset (106)) on the client device (102) against data loss (i.e., backup the asset(s)); and reconstruct one or more assets on the client device (102) following such data loss (i.e., recover the asset(s)). One of ordinary skill will appreciate that the client protection agent (104) may perform other functionalities without departing from the scope of the invention.

In one embodiment of the invention, the client asset (106) may refer to a database, or any logical container to and from which data (or any granularity thereof), which has been received by or generated on the client device (102), may be stored and retrieved, respectively. The client asset (106) may occupy any portion of persistent storage (not shown) available on the client device (102). Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage system (110) may represent any data backup, archiving, and/or disaster recovery storage service. The backup storage system (110) may be implemented using one or more servers (not shown). Each server may encompass a physical or virtual server, which may reside in an on-premises data center, a cloud computing environment, or a hybrid infrastructure thereof. Additionally, or alternatively, the backup storage system (110) may be implemented using one or more computing systems similar to the exemplary computing system shown in FIG. 3. Furthermore, the backup storage system (110) may include, but is not limited to, a backup operation predictor (112), a backup protection agent (114), and an asset copy repository (116). Each of these backup storage system (110) subcomponents is described below.

In one embodiment of the invention, the backup operation predictor (112) may refer to a computer program that may execute on the underlying hardware of the backup storage system (110). Specifically, the backup operation predictor (112) may be configured to forecast the success or failure of future short-term retention backup operations. To that extent, the backup operation predictor (112) may include functionality to: obtain forecast request(s) from the backup protection agent (114), which may pertain to predicting whether a future short-term retention backup operation (e.g., targeting the client asset (106) on the client device (102)) is most likely to result in success or failure; based on the obtained forecast request(s), derive backup operation prediction(s) entailing future short-term retention backup(s) (described below); and provide the derived backup operation prediction(s) to the backup protection agent (114) in response to the obtained forecast request(s). One of ordinary skill will appreciate that the backup operation predictor (112) may perform other functionalities without departing from the scope of the invention.

In one embodiment of the invention, any backup operation predictions may be derived from analyses applied to select information. The aforementioned select information may include, but is not limited to: backup error and/or exception logs maintained on the backup storage system (110) for one or more attempted, yet failed, past (and present) short-term backup operations; a state and utilization history associated with the backup targeted asset(s) (e.g., client asset (106)) on the client device (102); and any other information descriptive of backup failures and/or the backup targeted asset(s). The aforementioned select information is not limited to the aforementioned examples. Further, the analyses applied thereto may include any existing patternfinding algorithms, including, but not limited to, algorithms implemented through artificial intelligence and/or machine learning.

In one embodiment of the invention, the backup protection agent (114) may refer to a computer program that may execute on the underlying hardware of the backup storage system (110). Specifically, the backup protection agent (114) may be configured to perform server-side asset backup and recovery operations. To that extent, in general, the backup protection agent (114) may receive asset data, submitted by the client device (102), to store in the asset copy repository (116) during asset backup operations; and, conversely, may retrieve asset data from the asset copy repository (116) during asset recovery operations. Further, at least concerning embodiments of the invention, the backup protection agent (114) may include functionality to perform the method outlined in FIGS. 2A and 2B, below, which is directed to optimizing long-term retention backup policy within a recovery point objective (RPO). One of ordinary skill will appreciate that the backup protection agent (114) may perform other functionalities without departing from the scope of the invention.

In one embodiment of the invention, the asset copy repository (116) may refer to physical storage (or logical storage occupying at least a portion of the physical storage) on the backup storage system (110), where short-term retention asset copies (not shown) and long-term retention asset copies (not shown) (of at least the client asset (106) of the client device (102)) may be consolidated. The asset copy repository (116) may, at least in part, include persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 1 shows a configuration of components, other system (100) configurations may be used without departing from the scope of the invention. For example, the system (100) may further include one or more additional client devices (not shown) and/or one or more additional backup storage systems (not shown). By way of another example, the client device (102) may further include one or more additional client assets (not shown).

Figure 2A:
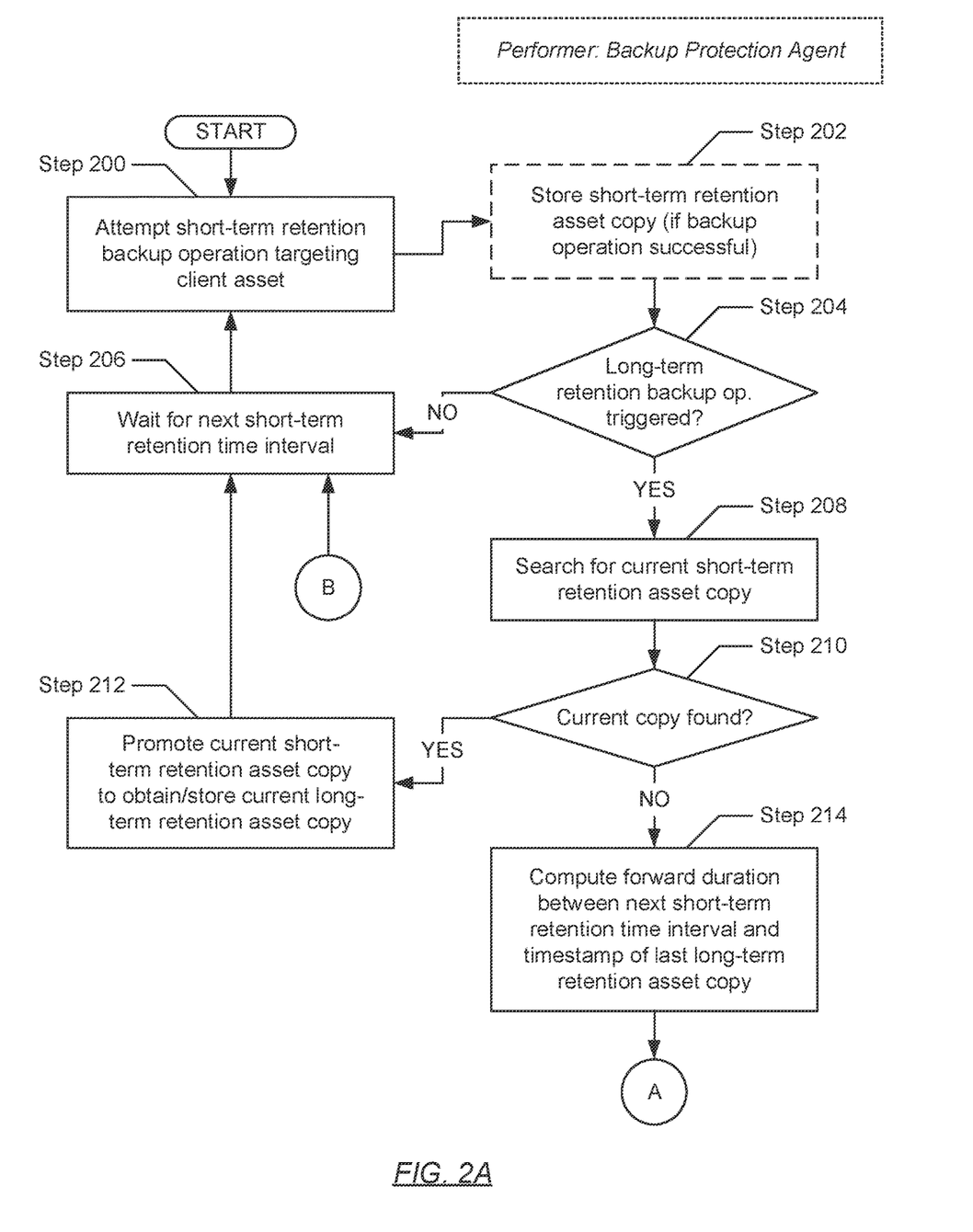
FIGS. 2A and 2B show flowcharts describing a method for optimizing long-term retention backup policy within a recovery point objective (RPO) in accordance with one or more embodiments of the invention.
Figure 2B:
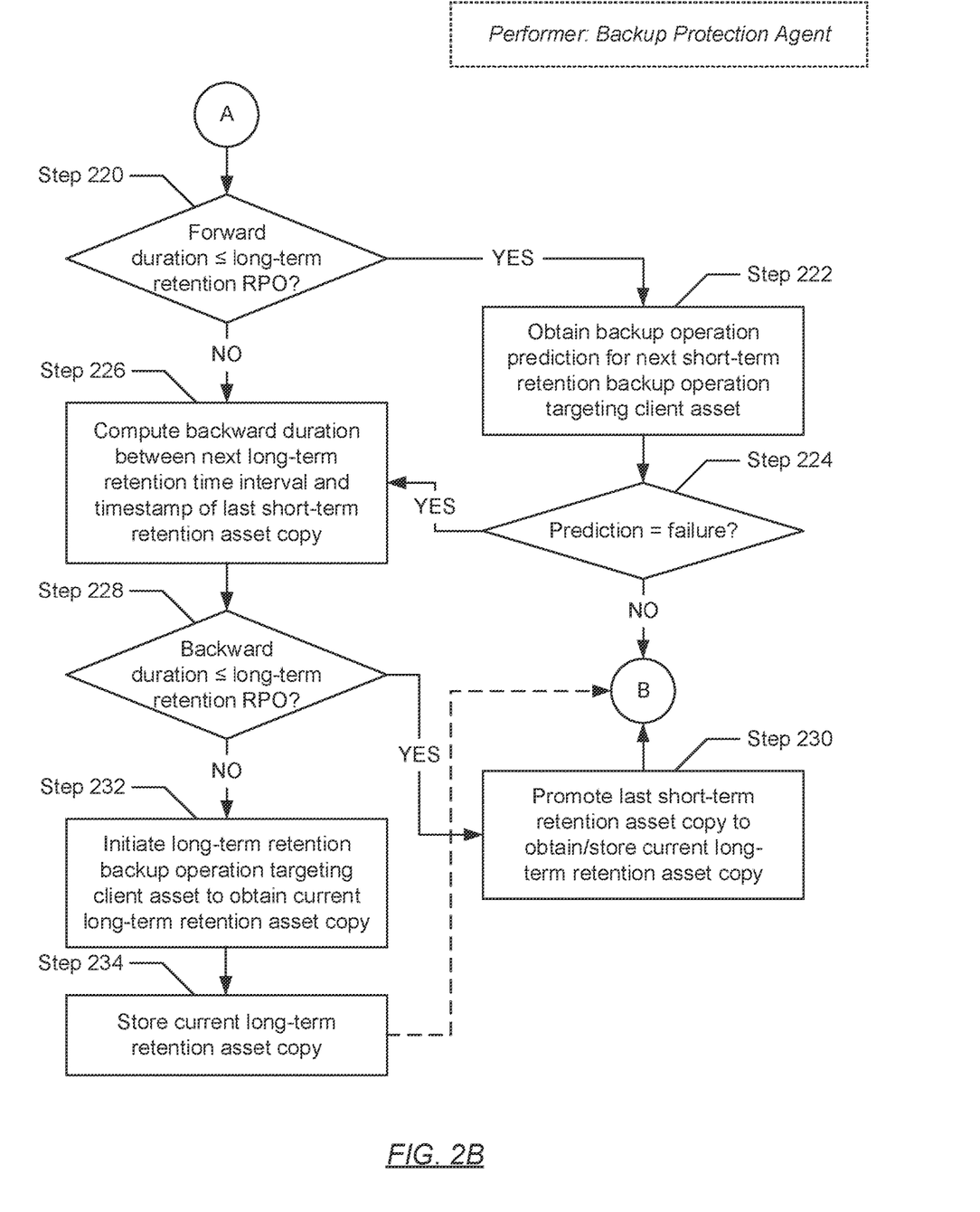

FIGS. 2A and 2B show flowcharts describing a method for optimizing long-term retention backup policy within a recovery point objective (RPO) in accordance with one or more embodiments of the invention. The various steps outlined below may be performed by a backup protection agent of a backup storage system (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a short-term retention backup operation is attempted. In one embodiment of the invention, the short-term retention backup operation may reference a scheduled process directed to asset replication, which may trigger at the periodic onset of a specified short-term retention time interval (e.g., one or more days). Further, the short-term retention backup operation may target a client asset (or any changes therein differing from a last short-term retention asset copy thereof) on a client device. Hereinafter, if the short-term retention backup operation was successful, the method proceeds to Step 202; otherwise, if the short-term retention backup operation was a failure, the method alternatively proceeds to Step 204.

In Step 202, following the success of the short-term retention backup operation (attempted in Step 200), a short-term retention asset copy resulting therefrom is stored in an asset copy repository (see e.g., FIG. 1) of the backup storage system. In one embodiment of the invention, the short-term retention asset copy (also referred to as a current short-term retention asset copy) may refer to a replication of the client asset (or any changes therein differing from a last short-term retention asset copy thereof) that had been obtained at a current short-term retention time interval (which may coincide with a current date).

In Step 204, following the failure of the short-term retention backup operation (attempted in Step 200), or following the storage of a (current) short-term retention asset copy (in Step 202), a determination is made as to whether a long-term retention backup operation has been triggered. The long-term retention backup operation may reference a scheduled process directed to asset replication, which may trigger at the periodic onset of a specified long-term retention time interval (e.g., one or more weeks, one or more months, one or more years). Further, similar to the short-term retention backup operation, a long-term retention backup operation may also target the client asset (or any changes therein differing from a last short-term retention asset copy thereof) on a client device. Accordingly, in one embodiment of the invention, if it is determined that the specified long-term retention time interval has not elapsed, then the long-term retention backup operation has not triggered and the method proceeds to Step 206. On the other hand, in another embodiment of the invention, if it is alternatively determined that the specified long-term retention time interval has elapsed, then the long-term retention backup operation has triggered and the method alternatively proceeds to Step 208.

In Step 206, following the determination (in Step 204) that a long-term retention backup operation has not triggered, the periodic onset of a next short-term retention time interval is waited on. Thereafter, upon the occurrence of the periodic onset of the next short-term retention time interval, the method proceeds to Step 200, where another short-term retention backup operation may be attempted.

In Step 208, following the alternative determination (in Step 204) that a long-term retention backup operation has triggered, a search for a current short-term retention asset copy (described above) is performed. In one embodiment of the invention, the search may be conducted throughout an asset copy repository (see e.g., FIG. 1) on the backup storage system, and may entail examining creation timestamps associated with short-term retention asset copies, of the client asset, for a short-term retention asset copy (if any) created on a current date.

In Step 210, a determination is made as to whether the search (performed in Step 208) resulted in a current short-term retention asset copy being found. Accordingly, in one embodiment of the invention, if it is determined that a current short-term retention asset copy has been found, then the method proceeds to Step 212. On the other hand, in another embodiment of the invention, if it is determined that a current short-term retention asset copy has not been found, then the method alternatively proceeds to Step 214.

In Step 212, following the determination (in Step 210) that a current short-term retention asset copy has been found, the current short-term retention asset copy is promoted. That is, in one embodiment of the invention, the long-term retention backup operation (triggered in Step 204) may entail the creation of a current long-term retention asset copy through duplication of the current short-term retention asset copy—e.g., a duplicate of the current short-term retention asset copy becomes the current long-term retention asset copy. The current long-term retention asset copy may refer to a replication of the client asset (or any changes therein differing from a last long-term retention asset copy thereof) that had been obtained at a current long-term retention time interval (which may coincide with a current date). The current long-term retention asset copy may subsequently be stored in the asset copy repository on the backup storage system. Hereinafter, the method proceeds to Step 206, where the periodic onset of a next short-term retention time interval may be waited on.

In Step 214, following the alternative determination (in Step 210) that a current short-term retention asset copy has not been found, a forward duration is computed. In one embodiment of the invention, the forward duration may encompass a length of time between an expected timestamp reflecting the onset of a next short-term retention time interval (e.g., the onset of a next day) and a recorded timestamp reflecting the creation date of a last long-term retention asset copy. The last long-term retention asset copy may refer to a long-term retention asset copy that had been created as a result of the triggering of a last long-term retention backup operation—i.e., a long-term retention backup operation that transpired at a given past point-in-time that is most chronologically proximal to a current time. Hereinafter, the method proceeds to Step 220 (see e.g., FIG. 2B).

Turning to FIG. 2B, in Step 220, a determination is made as to whether the forward duration (computed in Step 214) does not exceed (i.e., is less than or equal to) a specified long-term retention recovery point objective (RPO). A long-term retention RPO may refer to a maximum length of time, in compliance with an established service level agreement (SLA), permitted between the creation and storage of consecutive long-term retention asset copies. Accordingly, in one embodiment of the invention, if it is determined that the forward duration does not exceed the specified long-term retention recovery RPO, then the method proceeds to Step 222. On the other hand, in another embodiment of the invention, if it is alternatively determined that the forward duration does exceed the specified long-term retention RPO, then the method alternatively proceeds to Step 226.

In Step 222, following the determination (in Step 220) that the forward duration (computed in Step 214) does not exceed the specified long-term retention RPO, a backup operation prediction is obtained. In one embodiment of the invention, the backup operation prediction may encompass a forecast reflecting whether a next (future) short-term retention backup operation (e.g., to be attempted at the onset of a next (future) short-term retention time interval) would be a success or a failure. Further, the backup operation prediction may be obtained from the backup operation predictor (see e.g., FIG. 1) on the backup storage system.

In Step 224, a determination is made as to whether the backup operation prediction (obtained in Step 222) forecasts that a next (future) short-term retention backup operation will most likely fail. Accordingly, in one embodiment of the invention, if it is determined that the next (future) short-term retention backup operation is most likely to fail, then the method proceeds to Step 226. On the other hand, in another embodiment of the invention, if it is alternatively determined that the next (future) short-term retention backup operation is most likely to succeed, then the method alternatively proceeds to Step 206 (see e.g., FIG. 2A), where the periodic onset of the next (future) short-term retention time interval may be waited on.

In Step 226, following the determination (in Step 224) that the backup operation prediction (obtained in Step 222) forecasts that a next (future) short-term retention backup operation will most likely fail, a backward duration is computed. In one embodiment of the invention, the backward duration may encompass a length of time between an expected timestamp reflecting the onset of a next long-term retention time interval (e.g., the onset of a next week/month/year) and a recorded timestamp reflecting the creation date of a last short-term retention asset copy. The last short-term retention asset copy may refer to a short-term retention asset copy that had been successfully created as a result of the triggering of a last short-term retention backup operation—i.e., a short-term retention backup operation that successfully completed at a given past point-in-time that is most chronologically proximal to a current time.

In Step 228, a determination is made as to whether the backward duration (computed in Step 226) does not exceed (i.e., is less than or equal to) the specified long-term retention RPO (described above). Accordingly, in one embodiment of the invention, if it is determined that the backward duration does not exceed the specified long-term recovery RPO, then the method proceeds to Step 230. On the other hand, in another embodiment of the invention, if it is alternatively determined that the backward duration does exceed the specified long-term retention RPO, then the method alternatively proceeds to Step 232.

In Step 230, following the determination (in Step 228) that the backward duration (computed in Step 226) does not exceed the specified long-term retention RPO, the above-mentioned last short-term retention asset copy is promoted. That is, in one embodiment of the invention, the long-term retention backup operation (triggered in Step 204) may entail the creation of a current long-term retention asset copy through duplication of the last short-term retention asset copy—e.g., a duplicate of the last short-term retention asset copy becomes the current long-term retention asset copy. The current long-term retention asset copy may subsequently be stored in the asset copy repository on the backup storage system. Hereinafter, the method proceeds to Step 206 (see e.g., FIG. 2A), where the periodic onset of a next (future) short-term retention time interval may be waited on.

In Step 232, following the alternative determination (in Step 228) that the backward duration (computed in Step 226) does exceed the specified long-term retention RPO, a long-term retention backup operation, entailing the direct replication of the client asset (or any changes therein differing from a last long-term retention asset copy thereof) on a client device, is initiated. In one embodiment of the invention, initiation and completion of the aforementioned long-term retention backup operation may result in obtaining a current long-term retention asset copy.

In Step 234, the current long-term retention asset copy (obtained in Step 232) is subsequently stored in the asset copy repository (see e.g., FIG. 1) on the backup storage system. Hereinafter, the method proceeds to Step 206 (see e.g., FIG. 2A), where the periodic onset of a next (future) short-term retention time interval may be waited on.

Figure 3:
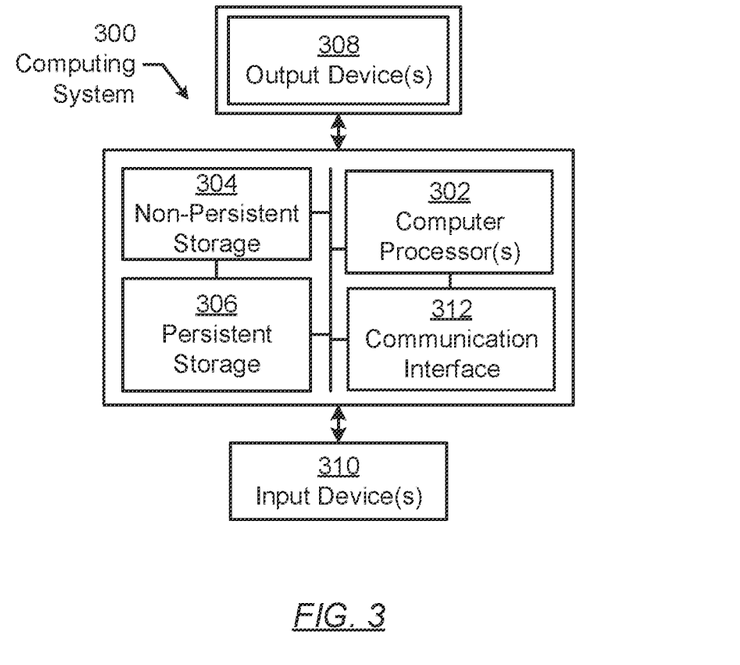
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4A:
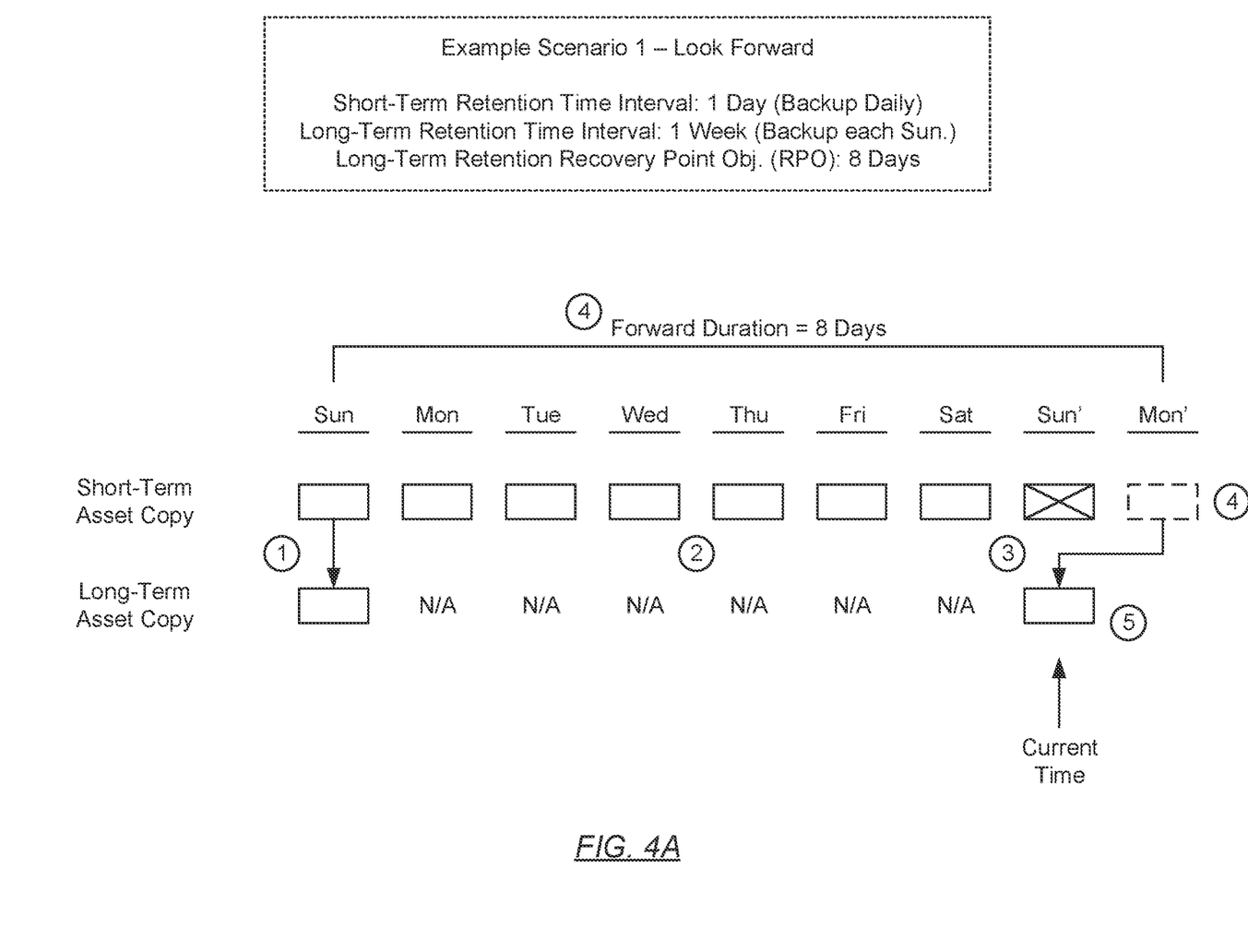
FIGS. 4A-4C show exemplary scenarios in accordance with one or more embodiments of the invention.
Figure 4B:
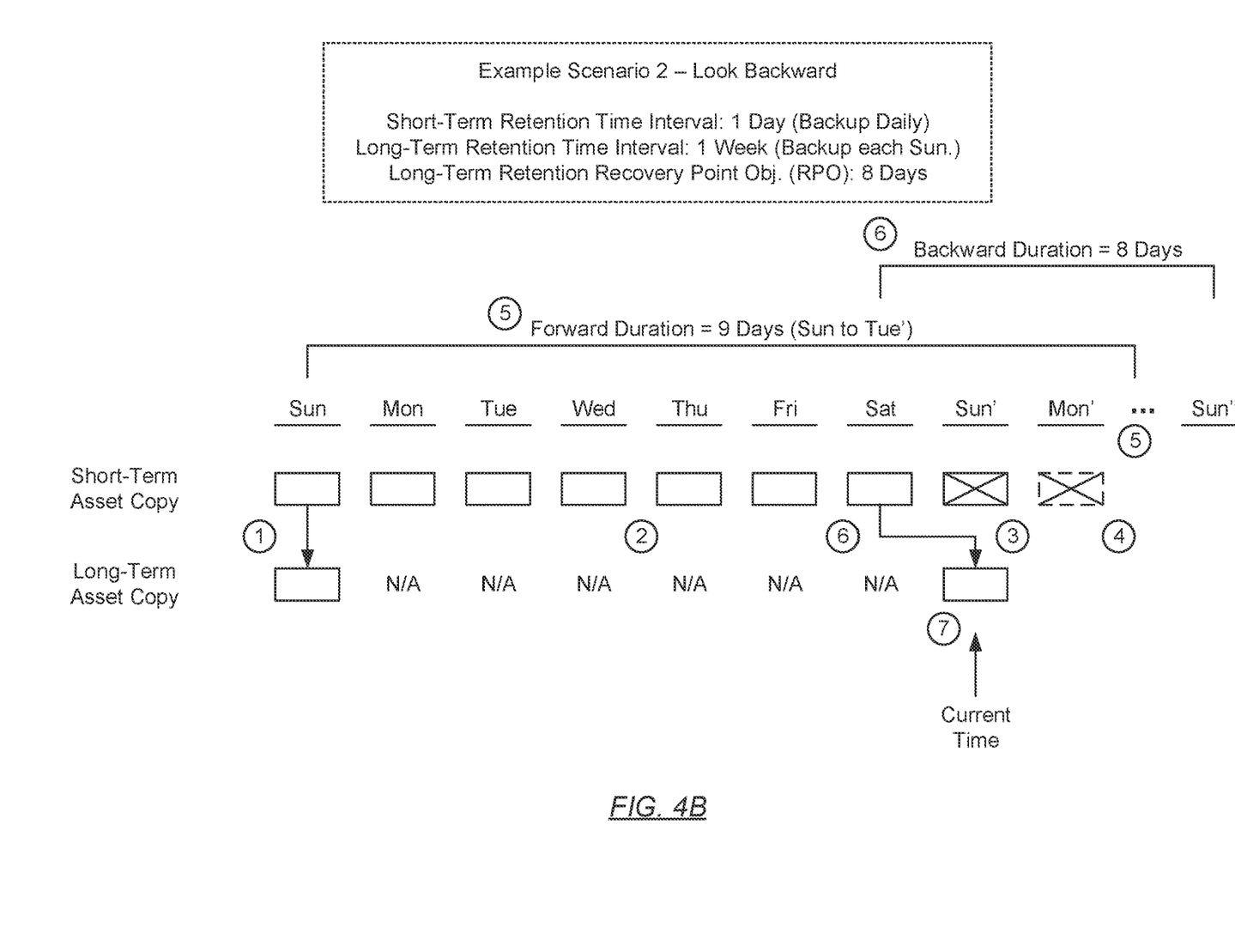
Figure 4C:
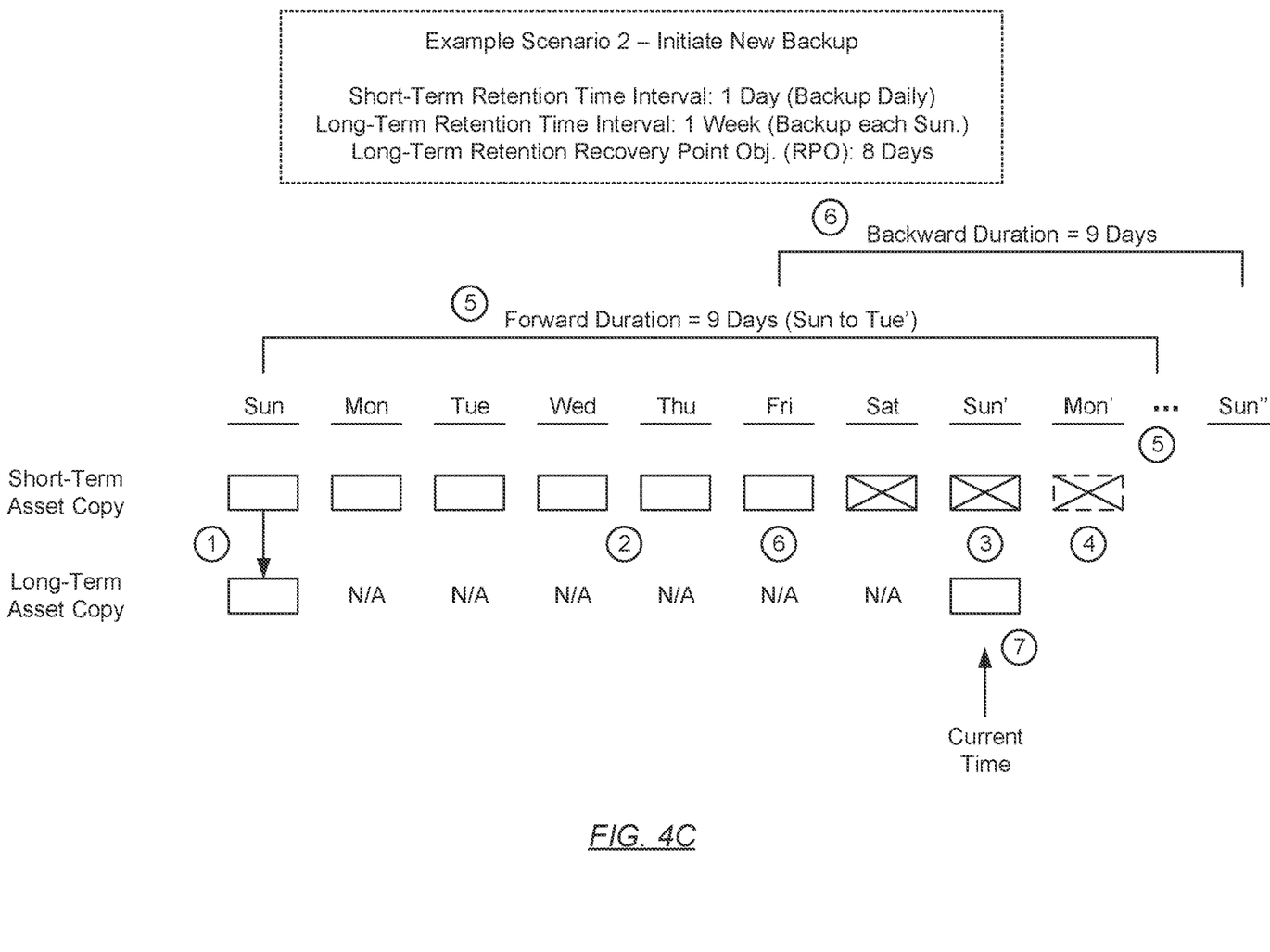

FIGS. 4A-4C show exemplary scenarios in accordance with one or more embodiments of the invention. The exemplary scenarios, illustrated through FIGS. 4A-4C and described below, are for explanatory purposes only and not intended to limit the scope of the invention.

For each of the following exemplary scenarios, consider an asset backup policy characterized through: (a) a short-term retention time interval of one day, meaning an attempt is to be made daily to obtain a short-term retention asset copy; (b) a long-term retention time interval of one week, meaning a long-term retention asset copy is to be obtained weekly (e.g., on every Sunday); and (c) a long-term retention recovery point objective (RPO) of eight days, meaning a maximum of eight days is permitted to elapse between consecutive creations of long-term retention asset copies.

Exemplary Scenario 1 (FIG. 4A)

1. On Sunday, an attempt to produce a Sunday short-term asset copy succeeds. Also, because it is Sunday, a long-term retention backup operation is triggered. Because the Sunday short-term asset copy exists, it is promoted to obtain a Sunday long-term retention asset copy.
2. From Monday through Saturday, attempts to produce Monday through Saturday short-term asset copies, respectively, all succeed. Also, throughout the aforementioned days, long-term retention backup operation(s) do not trigger because each of these aforementioned days is not a Sunday.
3. On Sunday', an attempt to produce a Sunday' (current) short-term asset copy fails. Also, because it is Sunday', a long-term retention backup operation is triggered.
4. Because a Sunday' short-term asset copy does not exist, a forward duration is computed (i.e., 8 days), which reflects the length of time between a next (future) short-term retention time interval (i.e., Monday') and the date of a last long-term retention asset copy (i.e., Sunday). The forward duration does not exceed the specified long-term retention RPO (i.e., 8 days) and, accordingly, a backup operation prediction is obtained for a short-term retention backup operation that is expected to take place on Monday'.
5. The backup operation prediction forecasts that the short-term retention backup operation that is expected to take place on Monday' will most likely succeed. Based on this forecast, the Sunday' (current) long-term retention asset copy will be obtained from the promotion of a Monday' short-term retention asset copy that is expected to be produced the next day.

Exemplary Scenario 2 (FIG. 4B)

1. On Sunday, an attempt to produce a Sunday short-term asset copy succeeds. Also, because it is Sunday, a long-term retention backup operation is triggered. Because the Sunday short-term asset copy exists, it is promoted to obtain a Sunday long-term retention asset copy.
2. From Monday through Saturday, attempts to produce Monday through Saturday short-term asset copies, respectively, all succeed. Also, throughout the aforementioned days, long-term retention backup operation(s) do not trigger because each of these aforementioned days is not a Sunday.
3. On Sunday', an attempt to produce a Sunday' (current) short-term asset copy fails. Also, because it is Sunday', a long-term retention backup operation is triggered.
4. Because a Sunday' short-term asset copy does not exist, a forward duration is computed (i.e., 8 days), which reflects the length of time between a next (future) short-term retention time interval (i.e., Monday') and the date of a last long-term retention asset copy (i.e., Sunday). The forward duration does not exceed the specified long-term retention RPO (i.e., 8 days) and, accordingly, a backup operation prediction is obtained for a short-term retention backup operation that is expected to take place on Monday'. The backup operation prediction, however, forecasts that that the short-term retention backup operation that is expected to take place on Monday' will most likely fail.
5. Based on the backup operation prediction, a second forward duration is computed (i.e., 9 days), which reflects the length of time between a second next (future) short-term retention time interval (i.e., Tuesday') and the date of the last long-term retention asset copy (i.e., Sunday).

6. The second forward duration exceeds the specified long-term retention RPO (i.e., 8 days) and, accordingly, a backward duration is computed (i.e., 8 days), which reflects the length of time between a date of a last short-term retention asset copy (i.e., Saturday) and a next (future) long-term retention time interval (i.e., Sunday").
7. The backward duration does not exceed the specified long-term retention RPO (i.e., 8 days) and, accordingly, the Saturday short-term retention asset copy is promoted to obtain the Sunday' (current) long-term retention asset copy.

Exemplary Scenario 3 (FIG. 4C)

1. On Sunday, an attempt to produce a Sunday short-term asset copy succeeds. Also, because it is Sunday, a long-term retention backup operation is triggered. Because the Sunday short-term asset copy exists, it is promoted to obtain a Sunday long-term retention asset copy.
2. From Monday through Friday, attempts to produce Monday through Friday short-term asset copies, respectively, all succeed. On Saturday, however, an attempt to produce a Saturday short-term retention asset copy fails. Also, throughout the aforementioned days, long-term retention backup operation(s) do not trigger because each of these aforementioned days is not a Sunday.
3. On Sunday', an attempt to produce a Sunday' (current) short-term asset copy fails. Also, because it is Sunday', a long-term retention backup operation is triggered.
4. Because a Sunday' short-term asset copy does not exist, a forward duration is computed (i.e., 8 days), which reflects the length of time between a next (future) short-term retention time interval (i.e., Monday') and the date of a last long-term retention asset copy (i.e., Sunday). The forward duration does not exceed the specified long-term retention RPO (i.e., 8 days) and, accordingly, a backup operation prediction is obtained for a short-term retention backup operation that is expected to take place on Monday'. The backup operation prediction, however, forecasts that that the short-term retention backup operation that is expected to take place on Monday' will most likely fail.
5. Based on the backup operation prediction, a second forward duration is computed (i.e., 9 days), which reflects the length of time between a second next (future) short-term retention time interval (i.e., Tuesday') and the date of the last long-term retention asset copy (i.e., Sunday).
6. The second forward duration exceeds the specified long-term retention RPO (i.e., 8 days) and, accordingly, a backward duration is computed (i.e., 9 days), which reflects the length of time between a date of a last short-term retention asset copy (i.e., Friday) and a next (future) long-term retention time interval (i.e., Sunday").
7. The backward duration exceeds the specified long-term retention RPO (i.e., 8 days) and, accordingly, a new long-term retention asset copy is produced, thereby becoming the Sunday' (current) long-term retention asset copy.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for optimizing long-term retention backup policy, the method comprising:
    performing a first search for a first current short-term retention asset copy;
    computing a first forward duration based on the first search resulting in the first current short-term retention asset copy not being found;
    obtaining, based on the first forward duration not exceeding a first long-term retention recovery point objective (RPO), a first backup operation prediction for a first next short-term retention backup operation; and
    waiting, based on the first backup operation prediction forecasting that the first next short-term retention backup operation is most likely to succeed, for a first next short-term retention time interval during which a first next short-term retention asset copy is expected to be created through the first next short-term retention backup operation,
    wherein the first next short-term retention asset copy is subsequently expected to be promoted to obtain a first current long-term retention asset copy.

2. The method of claim 1, wherein the first forward duration reflects a length of time between an expected timestamp for the first next-short term retention time interval and a recorded timestamp for a last long-term retention asset copy.

3. The method of claim 1, wherein the first long-term retention RPO defines a maximum length of time permitted to elapse between creations of consecutive long-term retention asset copies.

4. The method of claim 1, the method further comprising:
    performing a second search for a second current short-term retention asset copy; and
    promoting, based on the second search resulting in the second current short-term retention asset copy being found, the second current short-term retention asset copy to obtain a second current long-term retention asset copy.

5. The method of claim 1, the method further comprising:
    performing a second search for a second current short-term retention asset copy;
    computing a second forward duration based on the second search resulting in the second current short-term retention asset copy not being found;
    obtaining, based on the second forward duration not exceeding a second long-term retention RPO, a second backup operation prediction for a second next short-term retention backup operation;
    computing a backward duration based on the second backup operation prediction forecasting that the second next short-term retention backup operation is most likely to fail; and
    promoting, based on the backward duration not exceeding the second long-term retention RPO, a last short-term retention asset copy to obtain a second current long-term retention asset copy.

6. The method of claim 5, wherein the backward duration reflects a length of time between an expected timestamp for a next long-term retention time interval and a recorded timestamp for the last short-term retention asset copy.

7. The method of claim 1, the method further comprising:
    performing a second search for a second current short-term retention asset copy;

computing a second forward duration based on the second search resulting in the second current short-term retention asset copy not being found;

obtaining, based on the second forward duration not exceeding a second long-term retention RPO, a second backup operation prediction for a second next short-term retention backup operation;

computing a backward duration based on the second backup operation prediction forecasting that the second next short-term retention backup operation is most likely to fail; and initiating, based on the backward duration exceeding the second long-term retention RPO, a long-term retention backup operation to obtain a second current long-term retention asset copy.

8. The method of claim 1, the method further comprising:
performing a second search for a second current short-term retention asset copy;

computing a second forward duration based on the second search resulting in the second current short-term retention asset copy not being found;

computing a backward duration based on the second forward duration exceeding a second long-term retention RPO; and promoting, based on the backward duration not exceeding the second long-term retention RPO, a last short-term retention asset copy to obtain a second current long-term retention asset copy.

9. The method of claim 1, the method further comprising:
performing a second search for a second current short-term retention asset copy;

computing a second forward duration based on the second search resulting in the second current short-term retention asset copy not being found;

computing a backward duration based on the second forward duration exceeding a second long-term retention RPO; and initiating, based on the backward duration exceeding the second long-term retention RPO, a long-term retention backup operation to obtain a second current long-term retention asset copy.

10. A non-transitory computer readable medium (CRM) comprising computer readable program code, which when executed by a computer processor, enables the computer processor to perform a method for optimizing long-term retention backup policy, the method comprising:

performing a first search for a first current short-term retention asset copy;

computing a first forward duration based on the first search resulting in the first current short-term retention asset copy not being found;

obtaining, based on the first forward duration not exceeding a first long-term retention recovery point objective (RPO), a first backup operation prediction for a first next short-term retention backup operation; and waiting, based on the first backup operation prediction forecasting that the first next short-term retention backup operation is most likely to succeed, for a first next short-term retention time interval during which a first next short-term retention asset copy is expected to be created through the first next short-term retention backup operation, wherein the first next short-term retention asset copy is subsequently expected to be promoted to obtain a first current long-term retention asset copy.

11. The non-transitory CRM of claim 10, wherein the first forward duration reflects a length of time between an expected timestamp for the first next-short term retention time interval and a recorded timestamp for a last long-term retention asset copy.

12. The non-transitory CRM of claim 10, wherein the first long-term retention RPO defines a maximum length of time permitted to elapse between creations of consecutive long-term retention asset copies.

13. The non-transitory CRM of claim 10, wherein the method further comprises:
performing a second search for a second current short-term retention asset copy; and promoting, based on the second search resulting in the second current short-term retention asset copy being found, the second current short-term retention asset copy to obtain a second current long-term retention asset copy.

14. The non-transitory CRM of claim 10, wherein the method further comprises:
performing a second search for a second current short-term retention asset copy;

computing a second forward duration based on the second search resulting in the second current short-term retention asset copy not being found;

obtaining, based on the second forward duration not exceeding a second long-term retention RPO, a second backup operation prediction for a second next short-term retention backup operation;

computing a backward duration based on the second backup operation prediction forecasting that the second next short-term retention backup operation is most likely to fail; and promoting, based on the backward duration not exceeding the second long-term retention RPO, a last short-term retention asset copy to obtain a second current long-term retention asset copy.

15. The non-transitory CRM of claim 14, wherein the backward duration reflects a length of time between an expected timestamp for a next long-term retention time interval and a recorded timestamp for the last short-term retention asset copy.

16. The non-transitory CRM of claim 10, wherein the method further comprises:
performing a second search for a second current short-term retention asset copy;

computing a second forward duration based on the second search resulting in the second current short-term retention asset copy not being found;

obtaining, based on the second forward duration not exceeding a second long-term retention RPO, a second backup operation prediction for a second next short-term retention backup operation;

computing a backward duration based on the second backup operation prediction forecasting that the second next short-term retention backup operation is most likely to fail; and initiating, based on the backward duration exceeding the second long-term retention RPO, a long-term retention backup operation to obtain a second current long-term retention asset copy.

17. The non-transitory CRM of claim 10, wherein the method further comprises:
performing a second search for a second current short-term retention asset copy;

computing a second forward duration based on the second search resulting in the second current short-term retention asset copy not being found;

computing a backward duration based on the second forward duration exceeding a second long-term retention RPO; and promoting, based on the backward duration not exceeding the second long-term retention RPO, a last short-term retention asset copy to obtain a second current long-term retention asset copy.

18. The non-transitory CRM of claim 10, wherein the method further comprises:

performing a second search for a second current short-term retention asset copy;

computing a second forward duration based on the second search resulting in the second current short-term retention asset copy not being found;

computing a backward duration based on the second forward duration exceeding a second long-term retention RPO; and initiating, based on the backward duration exceeding the second long-term retention RPO, a long-term retention backup operation to obtain a second current long-term retention asset copy.

19. A system for optimizing long-term retention backup policy, the system comprising:

a backup storage system, comprising:

a computer processor; and memory comprising instructions, which when executed by the computer processor, enables the computer processor to perform a method, the method comprising:

performing a search for a current short-term retention asset copy;

computing a forward duration based on the search resulting in the current short-term retention asset copy not being found;

obtaining, based on the forward duration not exceeding a long-term retention recovery point objective (RPO), a backup operation prediction for a next short-term retention backup operation; and waiting, based on the backup operation prediction forecasting that the next short-term retention backup operation is most likely to succeed, for a next short-term retention time interval during which a next short-term retention asset copy is expected to be created through the next short-term retention backup operation, wherein the next short-term retention asset copy is subsequently expected to be promoted to obtain a current long-term retention asset copy.

20. The system of claim 19, the system further comprising:

a client device operatively connected to the backup storage system and comprising a client asset, wherein the next short-term retention backup operation is expected to target the client asset.

* * * * *